March 31, 1925.

W. H. SMITH 1,531,882

PRESS FEEDING DEVICE

Original Filed April 11, 1921   6 Sheets-Sheet 1

Fig-1

Inventor
Walter H Smith
By- Charles G. Cope Atty.

March 31, 1925.

W. H. SMITH

PRESS FEEDING DEVICE

Original Filed April 11, 1921   6 Sheets-Sheet 5

1,531,882

March 31, 1925.  1,531,882
W. H. SMITH
PRESS FEEDING DEVICE
Original Filed April 11, 1921   6 Sheets-Sheet 6

Inventor
Walter H. Smith
By Charles G. Cooke Atty.

Patented Mar. 31, 1925.

1,531,882

UNITED STATES PATENT OFFICE.

WALTER H. SMITH, OF PITTSBURGH, PENNSYLVANIA, ASSIGNOR TO MILLER SAW-TRIMMER COMPANY, OF PITTSBURGH, PENNSYLVANIA, A CORPORATION OF PENNSYLVANIA.

PRESS-FEEDING DEVICE.

Application filed April 11, 1921, Serial No. 460,243. Renewed August 4, 1924.

*To all whom it may concern:*

Be it known that I, WALTER H. SMITH, a subject of the King of Great Britain, residing at Pittsburgh, in the county of Allegheny and State of Pennsylvania, have invented new and useful Improvements in Press-Feeding Devices, of which the following is a specification.

My invention pertains to sheet feeding devices, and has as an object the provision of a sheet feeding device which will be an improvement upon devices for the same purpose as heretofore proposed, in having a greater definiteness and certainty of operation, whilst still being capable of being run at a high speed. It is another object of my invention to provide a feeding device which will allow of especially ready access to the parts of the machine in connection with which it is being used. Another object lies in the provision of a sheet feeding device which will be of a particularly simple and easily understood construction, capable of being manufactured at a relatively low cost, and efficient in its function of handling widely varying stock at high speeds. Other and further objects of my invention will be gathered from the following specification and the claims forming a part thereof.

I have shown, as an example, in the accompanying drawings, and described in the following specification, one form of press feeding device constructed in accordance with my invention. I wish it understood, however, that the invention may be embodied in other forms, and that changes may be made in the form described and shown, without exceeding the scope thereof, as defined in the appended claims.

Figure 1:
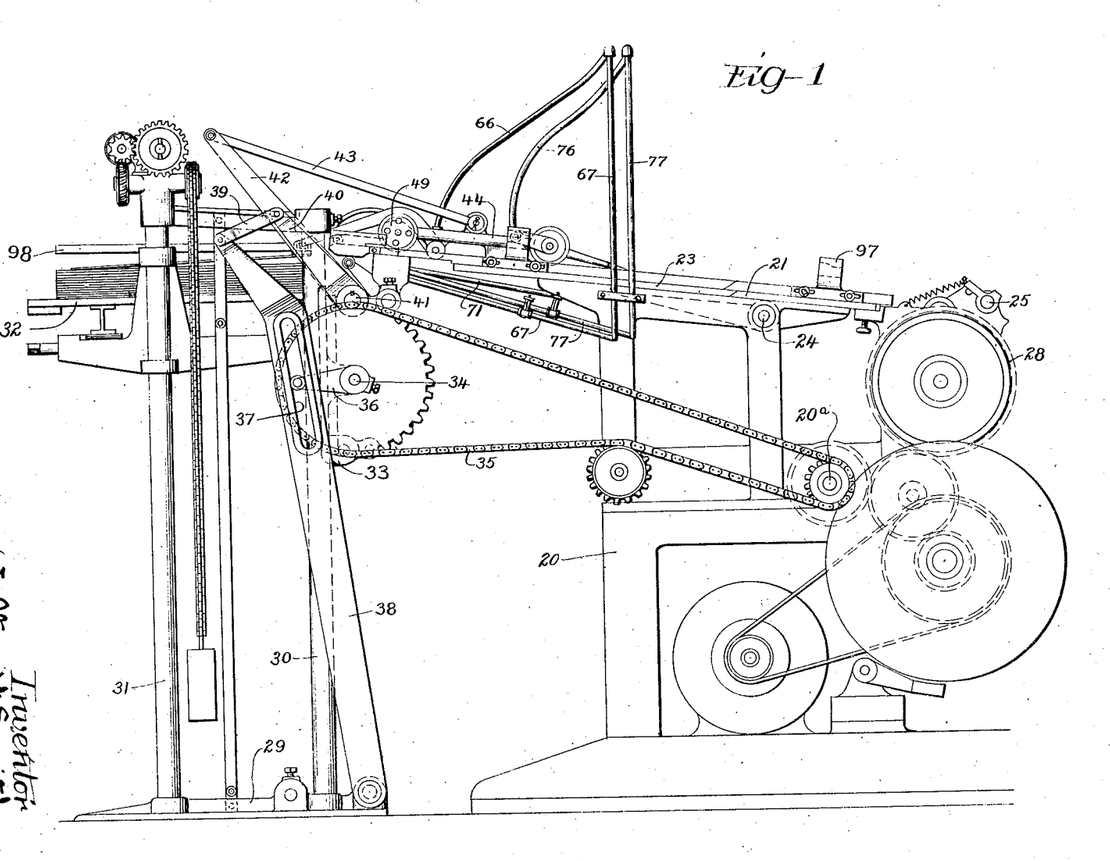
Fig. 1 is a side elevation of an automatic press feeding device constructed in accordance with my invention, shown applied to a cylinder press.
Figure 2:
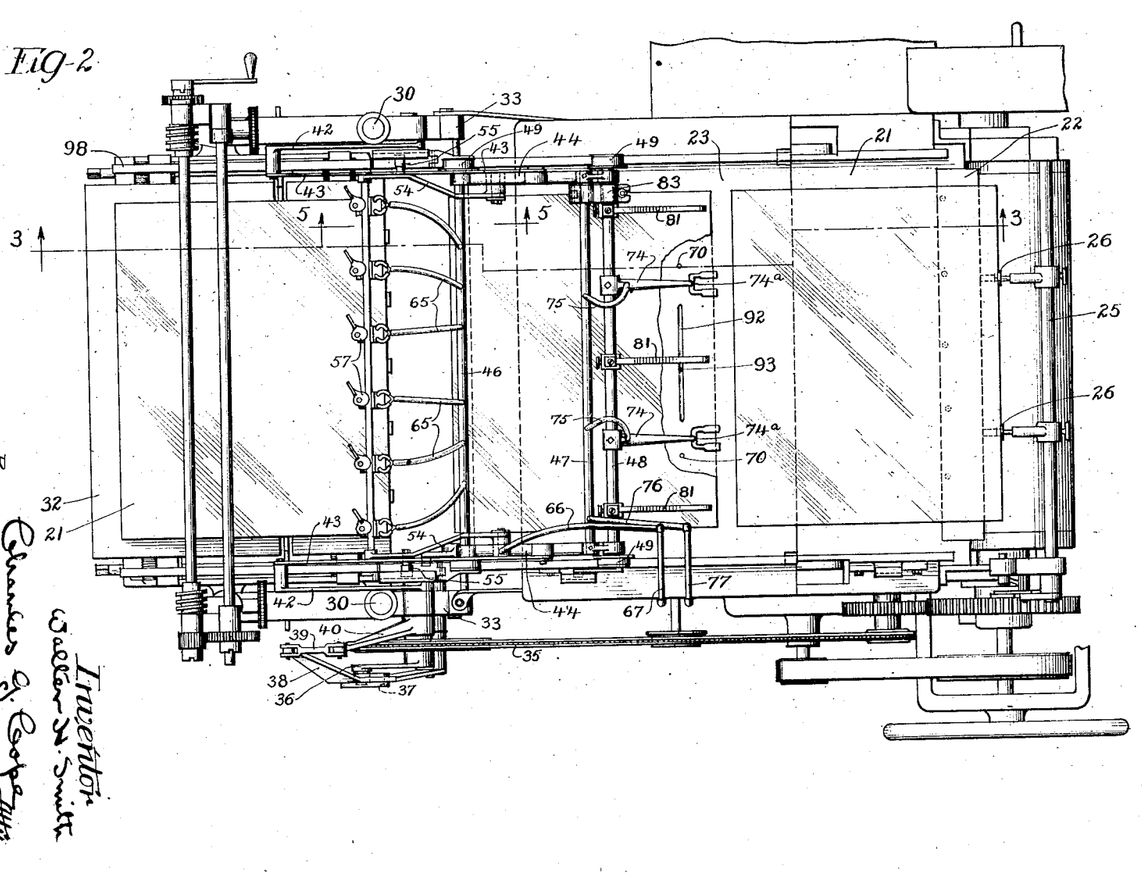
Fig. 2 is a plan of the same.
Figure 3:
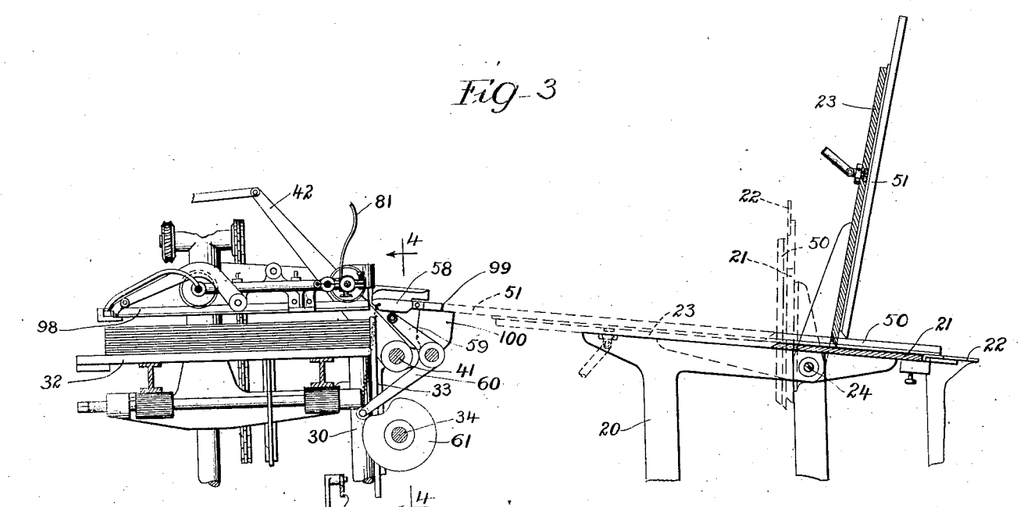
Fig. 3 is a sectional elevation, taken on the broken line 3—3 of Fig. 2, showing the feed carriage withdrawn from its operative position on the tracks, and the rear board of the feed table raised in order to permit access to the type-bed, etc., and showing, in a dotted position, the front-board of the feed table raised, to permit access to the cylinder, etc.

Referring now to the drawings, and particularly to Figs. 1–3 thereof, 20 designates the frame of a cylinder press of a well known type. The press is provided with a feed table including a rear board 23 and a front board 21 provided, at its front part, with a feed plate 22. The front and rear feed boards 21 and 23 are provided with brackets for separately pivoting them on a rod 24, extending transversely across the press, in such manner that the rear feed board 23 can be swung upwardly, as indicated in Fig. 3, independently of the front feed board, to permit access to the type bed, etc., and the front feed board 21 can be swung upwardly, as indicated in dotted lines in Fig. 3, independently of the rear feed board, to permit access to the cylinder 28, etc. Mounted on a rock shaft 25 are a pair of press guides 26 which cooperate with tongues 27 extending forward from the front feed board 21. In the ordinary operation of such a press, the sheet is fed so that its front edge rests on the tongues 27, in engagement with the guides 26 in correct position to be received by the grippers of the cylinder 28. At the correct time, the press guides 26 are automatically raised out of the path of the front edge of the sheet, allowing the latter to be seized by the cylinder grippers and drawn off the feed table for the printing operation.

In carrying my invention into effect, I provide, at the rear of the press, and separated therefrom a sufficient distance to provide room for the passage of an operator, the insertion of a form, etc., a framework 29 including front pillars 30 and rear pillars 31. In this framework is mounted a stock table 32 having associated therewith automatic mechanism for raising it, to compensate for the decrease in the height of the pile as sheets are successively taken away.

Secured to the front sides of the pillars 30, are brackets 33, provided with bearings for receiving a transverse shaft 34, driven, by means of a chain 35, from a sprocket geared to one of the press shafts. The shaft 34 is provided with a crank 36, the pin of which enters a slot 37 formed in an arm 38 which is rockably mounted on the base of the framework 29. The rock arm 38 is connected, by means of a link 39, with a crank arm 40 secured to a shaft 41 carried by bearings extending from the brackets 33 and extending transversely across the machine. The shaft 41 carries a pair of drive arms 42, each of which is connected, by means of a link 43, with the feed carriage 44; so that as the arm 38 rocks the feed carriage 44 will be moved forward and backward along the feed table.

Figure 6:
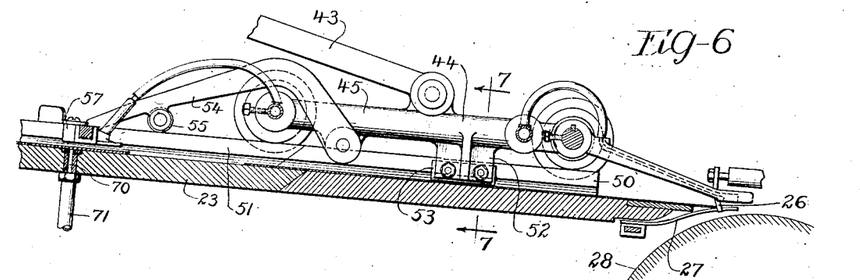
Fig. 6 is a sectional elevation of the feed carriage, showing the latter in the position it occupies just after a sheet has been fed by the front feed arms to the press guides.
Figure 7:
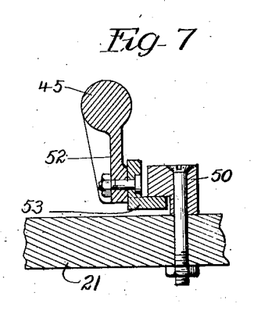
Fig. 7 is an enlarged section, taken on the lines 7—7 of Fig. 6, showing the means for holding the feed carriage down on its tracks.
Figure 8:
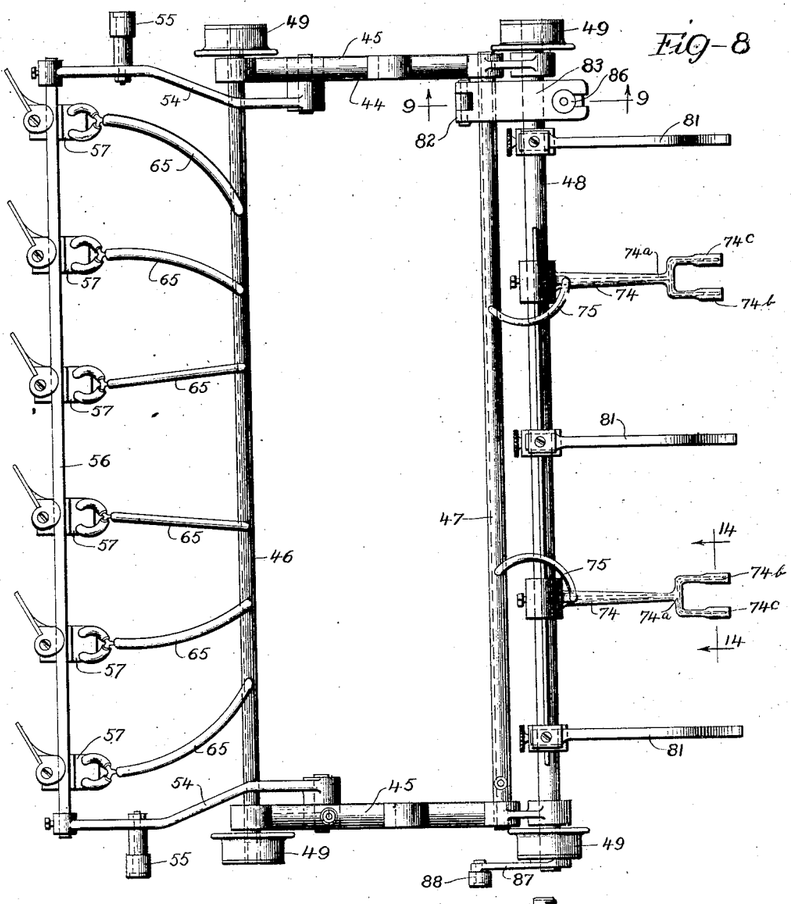
Fig. 8 is a plan of the feed carriage.

The feed carriage 44 (Figs. 6–8 inclusive) includes a pair of side members 45 connected together by transverse tubes 46 and 47 and having mounted to rock therein a transverse shaft 48. Upon the ends of the tube 46, and on the shaft 48, are rotatably mounted rollers 49, which run on tracks secured to the feed table. These tracks are made up of front sections 50, secured to the front feed board 21, and rear sections 51, secured to the rear feed board 23, the joints of the track sections being bevelled and so placed as to allow the front and rear feed boards to be swung about the rod 24 as described above and as indicated in Fig. 3. Each side frame 45 of the feed carriage is formed with a downwardly extending lug 52 having a side flange 53 which extends beneath the adjacent rail section (Fig. 7), thereby obviating any chance of the feed carriage accidentally coming off the tracks.

The feed carriage 44 has pivoted thereto a pair of rear feed arms 54, each carrying a roll 55 adapted to run on the said tracks and thereby to support the said arms 54. The said rear feed arms are connected with each other by a transverse bar 56, on which are mounted a number of removable and adjustable suction feet 57, which may be of a nature similar to those disclosed in United States Pat. No. 1,194,327, granted August 8th, 1916, on the application of Edward Cheshire. The rear track sections 51 have hinged thereto extensions 58 which are supported on rollers carried by the short arms 59 of cam levers 60. The cam levers 60 cooperate with cams 61 secured to the shaft 34, and normally hold the track extensions 58 in the position in which they make alignment with the track sections 51. Just as the feed carriage 44 reaches its rearmost position, however, in which position the suction feet 57 are just above the front edge of the pile of stock, 62, depressions 63 of cams 61 allow the cam levers to be pulled down, by springs 64, into the position shown in dotted lines in Fig. 5, whereby, the support being withdrawn from the rolls 55, the rear feed arms 54 are permitted to descend until the suction feet 57 rest on the top sheet of the pile. At this time, suction is applied to the feet 57, whereby the top sheet becomes attached thereto and moves therewith when the cams 61, actuating the track extensions 58, cause the rear feed arms to rise again into the position shown in full lines in Fig. 5. After this separation and raising of a sheet has taken place, the feed carriage moves forward over the feed table, the suction feet 57 carrying the separated sheet with them until they reach their extreme forward position, about half way between the press guides 26 and the front of the pile. At this time suction is cut off from the feet 57, the adhesion of the sheet to the suction feet 57 being thus broken, so that the sheet drops onto the rear feed board 23. For applying suction to the feet 57, each foot is provided with a hose 65 which connects it with the tube 46, the tube, being, in turn, connected, through a flexible hose 66 and pipe 67, with an air valve 68 (Fig. 4) periodically actuated by a cam 69 on the shaft 34. A pair of suction holes 70 are formed in the rear feed board 23 in such a position that they will be covered by the front part of the sheet when it is fed forward by the suction feet 57. These suction holes 70 connect, by means of piping 71, with a valve 72 (Fig. 4) actuated by a cam 73 on the shaft 34. The valve 72 is so operated that suction is applied to the holes 70 at the same time suction is cut off from the feet 57; so that the sheet, immediately upon being released by the suction feet 57, becomes attached to the feed board 23 and is held against movement with respect thereto.

On the rock shaft 48 of the feed carriage are mounted, so as to be adjustable lengthwise thereof, a pair of front feed arms 74 which are made hollow, and connect, by means of hose 75, with the tube 47. The tube 47, in turn, connects, by a flexible hose 76 and pipe 77 with a valve 78 actuated by a cam 79 on the shaft 34 (Fig. 4), which valve applies suction to the front feed arms 74, and cuts it off, at the proper time. Each front feed arm 74 is formed with a suction fork $74^a$ at its front end, the inner and outer arms $74^b$ and $74^c$ of such fork being spaced apart a sufficient distance to enable them to pass one on each side of the press guides 26. The said arms $74^b$ and $74^c$ are formed with elongated suction slots $80^b$ and $80^c$, extending lengthwise thereof; the slots $80^b$ in the inner arms $74^b$ being wider than the slots $80^c$ in the outer arms $74^c$, so that the sheet will release more readily at the points close to the inside edges of the press guides 26 than at the points close to the outside edges of such guides, whereby the possibility of the sheet being tilted at such guides is lessened. When the feed carriage is in its rearward position, the suction forks $74^a$ of the front feed arms 74 are above the front edge of the sheet which has just been fed forward by the rear feed arms 54 and left in position on the feed table, secured thereon by air suction, effective through the holes 70. The suction forks $74^a$ take the sheet from this position and feed it forward to the press guides, suction being cut off, just at this time, from the holes 70. Fingers 81 are adjustably mounted on the rock shaft 48, their ends being disposed so as to move in close proximity with the feed table, thereby maintaining the sheet being fed flat upon the table and offsetting any tendency of the sheet to curl or the like.

Figure 4:
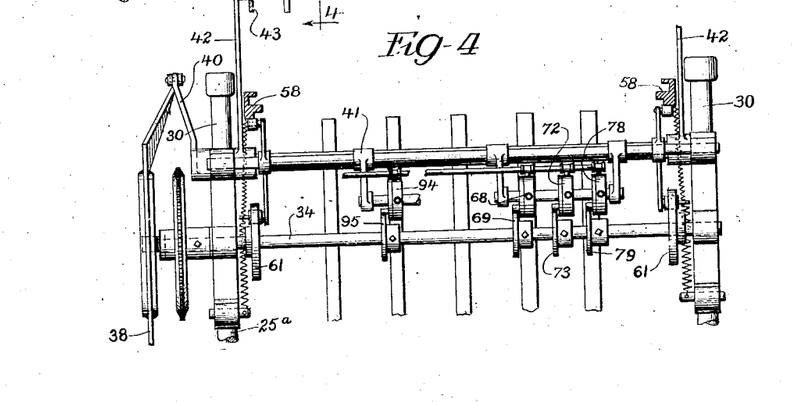
Fig. 4 is a sectional elevation, the section being taken on the line 4—4 of Fig. 3.
Figure 9:
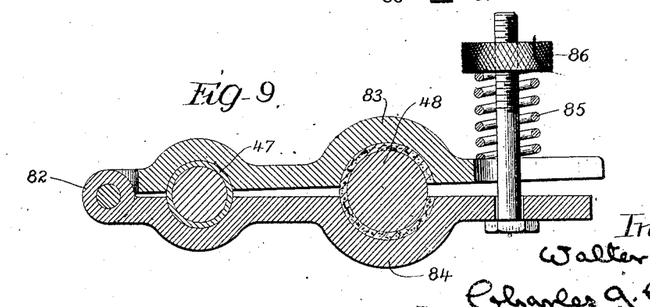
Fig. 9 is an enlarged section on the line 9—9 of Fig. 8.
Figure 11:
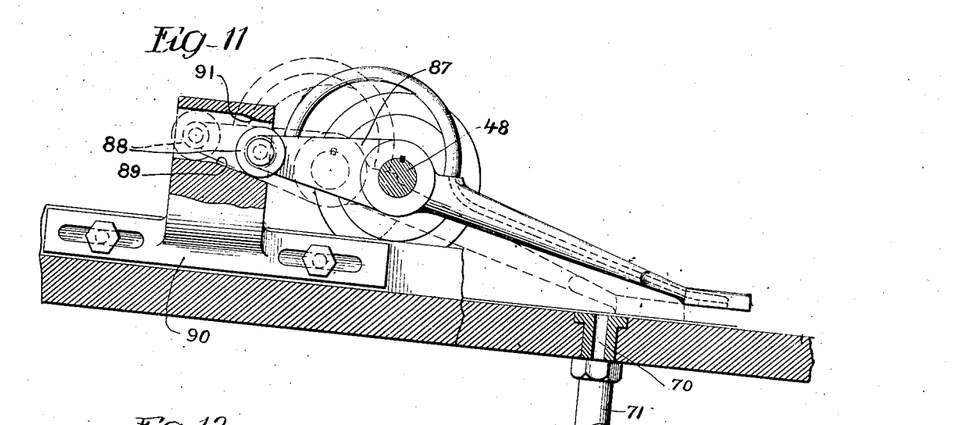
Fig. 11 is a sectional view of the cam for lowering the front feed arms onto the sheet, showing such arms in the positions they occupy before and after being thus lowered.
Figure 12:
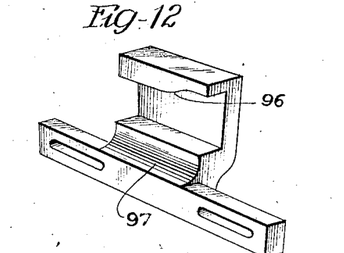
Figs. 12 and 13 are perspective views of the cams shown in Figs. 10 and 11, respectively.
Figure 13:
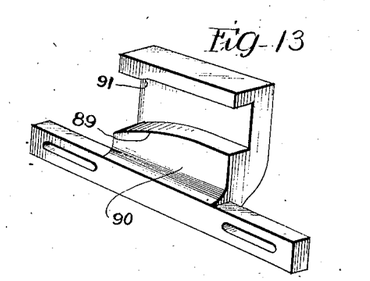
Figure 14:
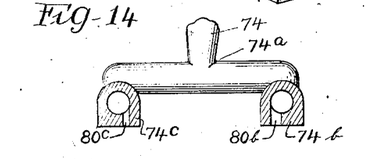
Fig. 14 is a transverse section through the suction foot at the end of one of the front feed arms, the section being taken on the line 14—14 of Fig. 8.

A hinged clamp 82 (Fig. 9) is mounted on the tube 47, and is provided with jaws 83, 84 which embrace the rock shaft 48, pressure being exerted on these jaws by a spring 85, the compression of which is adjustable by means of a thumb nut 86. The rock shaft 48 is thus normally held by friction against movement, but can be rocked when force is applied thereto. The rock shaft is provided, at one end, with a lever 87 having at its end a cam roll 88. As the front feed arms, moving with the suction forks $74^a$ on a level somewhat higher than that of the feed table, approach the rearward position in which they are about to seize a sheet (see full lines Fig. 11), the cam roll 88 strikes the upwardly inclined cam surface 89 of a fixed cam 90 secured to one of the rear rail sections 51. In this manner the lever 87 is raised, and the suction forks $74^a$ are caused to descend unto the sheet of paper which has previously been fed forward by the suction feet 57 of the rear feed arms 54 (see dotted lines Fig. 11). As the feed carriage 44 begins to move forward again, suction having been applied to the suction forks $74^a$, the roll 88 strikes a small cam projection 91, at the upper part of the fixed cam 90, whereby the lever 87 is depressed a very little, the suction forks $74^a$ being thus raised a little, so that the sheet, now attached to these forks, will be fed forward by them in a plane slightly above that of the feed table. Air is thus admitted between the sheet and the table, thus facilitating the forward movement of the sheet. To further facilitate the seizing of the sheet by the suction forks $74^a$, prevent its adhesion to the feed table, and insure the presence of a film of air between the sheet and the feed table, the latter is formed with a transverse shallow channel 92 (Fig. 2), having at the center a hole 93, connected by suitable piping (not shown) with a valve 94 periodically actuated by a cam 95 on the shaft 34 (Fig. 4). The valve 94 is connected with a source of supply of compressed air, and is so timed that a slight blast, effective throughout the channel 92, will be produced just at the time the sheet is to be seized by the suction forks $74^a$.

Figure 10:
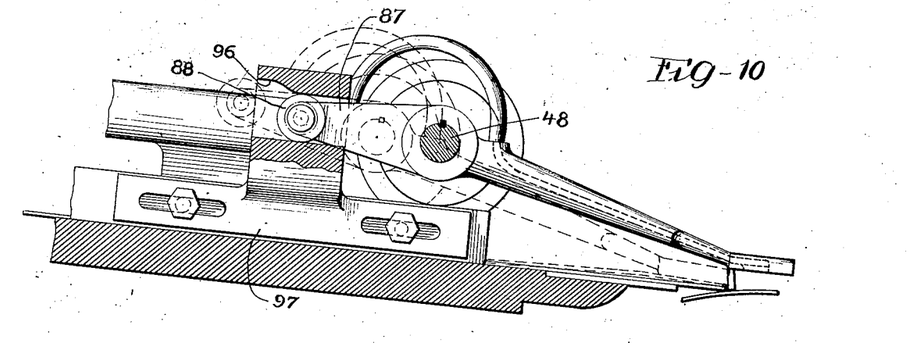
Fig. 10 is a sectional elevation showing the cam for raising the front feed arms at the time the sheet is fed to the press guides, and showing such arm in the position which it occupies before and after being thus raised.

During the forward movement of the feed carriage 44, the front feed arms 74 are maintained, by the friction clamp 82 described above, in the position in which the sheet, attached to the suction forks $74^a$, is held a very slight distance above the surface of the feed table. They continue in this relative position until the feed carriage approaches the front limit of its movement (dotted lines Fig. 10), when the edge of the sheet engages against the press guides 26. Such engagement of the sheet with the press guides prevents further forward movement of the sheet, the suction forks $74^a$ then sliding over the sheet as they conclude their forward movement. As soon as the suction forks $74^a$ begin to slide with respect to the sheet, the ends of the elongated suction slots $80^b$ and $80^c$ in the arms $74^b$ and $74^c$ of said forks begin to be gradually uncovered; so that there is a leakage of air into such suction slots, resulting in a gradual diminution of the holding effect of the suction forks $74^a$ on the sheet. In this way, it is ensured that the sheets shall be evenly pushed into engagement with the press guides. Just before the extreme end of the forward movement of the feed carriage, the cam roll 88 comes into engagement with the downwardly inclined cam surface 96 of a second fixed cam 97. By this engagement of the cam roll 88 with the cam surface 96, the lever 87 is forced downward, and the shaft 48 consequently rocked so as to raise the suction forks 74ª to a position somewhat above the plane of the feed table (full lines Fig. 10). This position of the front feed arms 74 is maintained, by means of the friction clamp 82, during the rearward movement of the feed carriage back to the position shown in full lines in Fig. 11. By this means, proper clearance between the suction forks 74ª and the sheet just fed by them, during the return movement of the feed carriage 44, is provided for.

Figure 5:
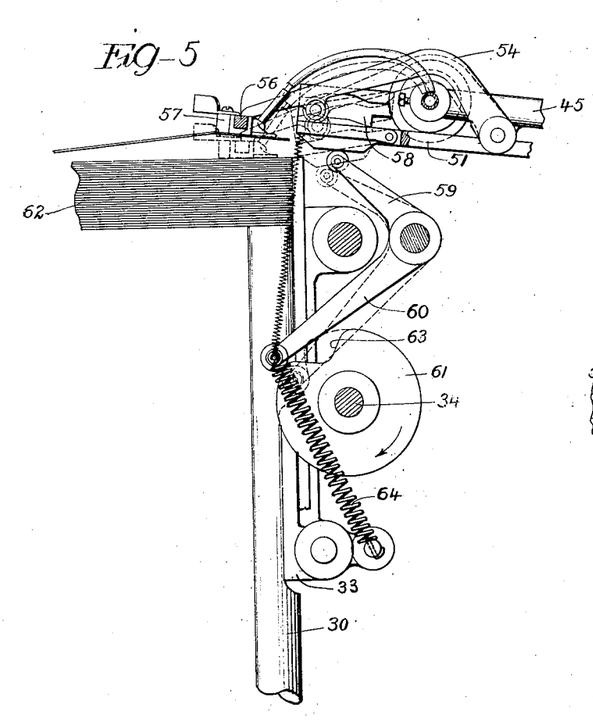
Fig. 5 is an enlarged section, taken on the line 5—5 of Fig. 2, showing, in full lines, the position which the rear feed arms occupy after just having separated and raised a sheet from the pile of stock, and in dotted lines, the position which these arms occupy just prior to raising a sheet from the pile.

The operation of the machine is as follows:

With the feed carriage 44 in its extreme rearward position, the suction feet 57 on the rear feed arms 54 will, with suction applied, be resting upon the top sheet of the pile (dotted lines, Fig. 5). At the same time, the suction forks 74ª of the front feed arms 74 will be resting upon a sheet which has previously been fed forward and retained in an intermediate position on the feed table by suction applied through the holes 70 (dotted lines, Fig. 11). As the feed carriage begins to move forward, the suction feet 57, through the operation of the cam 61, will be raised to the position shown in full lines in Fig. 5, the top sheet being thereby separated from the balance of the pile. At about the same time, the cam roll 88 will have engaged the cam projection 91 of the fixed cam 90, thereby starting the sheet held by the suction forks 74ª forward and raising it a little above the level of the feed board. As the feed carriage continues its forward movement, two sheets are simultaneously fed forward, one sheet by the suction feet 57 to an intermediate position on the feed board, and the other sheet by the suction forks 74ª to the press guides. To permit and facilitate the carrying forward of the front sheet by the suction forks 74ª, suction will have been cut off from the holes 70, and a slight blast of air will have been introduced beneath the front sheet at the channel 92. Near the end of the forward movement of the feed carriage, the sheet carried by the suction feet 57 is released, by suction being cut off from the latter, suction being simultaneously applied at the holes 70, in order to maintain such sheet in its intermediate position on the feed board. At the same time the suction forks 74ª of the front feed arms will have deposited a sheet against the press guides 26 and risen, preparatory to their return movement, as above described. The sheet carriage then returns to its original rearward position, the suction feet 57 of the rear feed arms 54 seizing another sheet from the pile, and the suction forks 74ª of the front feed arms 74 seizing the sheet which was last moved forward, by the suction feet 57, to the intermediate position on the feed board.

Extension rails 98 are mounted in the framework 29 (Figs. 1–3), onto which the feed carriage 44 can be rolled when the links 43 are disconnected from it. The rear rail sections 51 are divided at 99, their severed extremities being supported by extensions 100 of the brackets 33. By disconnecting the links 43 from the feed carriage 44, and rolling the latter back on to the track extensions 98, the rear feed board, with the rear track sections 51 and other parts which it carries, can be swung up into the position shown in Fig. 3, thereby permitting ready access to the type bed etc., for make-ready, inserting a form, or the like. So long as the feed carriage is not on the front feed board 21, the latter may at all times be swung up as indicated in dotted lines in Fig. 3, to permit access to the cylinder. Another advantage of the construction is that if it is desired to feed the press by hand, it is only necessary to disconnect the feed carriage and roll it onto the extension rails 98, whereupon the whole feed board is left free for hand feeding. Still a further advantage lies in the simplification and economy of movement obtained by the provision of a double-acting sheet feeding carriage, one of the sheet moving elements of which also operates to separate the sheets from the pile. The mechanism is relatively simple to manufacture and easy to operate, and is capable of handling stocks of paper of widely varying qualities, and feeding at an exceptionally high speed.

Having thus fully described my said invention, what I claim as new, and desire to secure by Letters Patent, is:

1. Mechanism for feeding sheets from a pile to the guides of a press, comprising a carriage reciprocable between forward and rear positions, a rear suction member associated with said carriage for separating sheets from the pile and moving them forward to an intermediate position, and a front feed member associated with said carriage for moving sheets from said intermediate position to the press guides.

2. Mechanism for feeding sheets from a pile to the guides of a press, comprising a carriage reciprocable between forward and rear positions, a rear suction member associated with said carriage for separating sheets from the pile and moving them forward to an intermediate position, and a front suction member associated with said carriage for moving sheets from said intermediate position to the press guides.

3. Mechanism for feeding sheets from a pile to the guides of a press, comprising a carriage reciprocable between forward and rear positions, a plurality of rear suction members associated with said carriage for separating sheets from the pile and moving them forward to an intermediate position, and a plurality of front suction members, one for each press guide, associaed with said carriage for moving sheets from said intermediate position to the press guides.

4. Mechanism for feeding sheets from a pile to the guides of a press, comprising a carriage reciprocable between forward and rear positions, a rear suction member associated with said carriage for separating sheets from the pile and moving them forward to an intermediate position, means for imparting a dipping movement to said rear suction member when said carriage is substantially in its rear position, and a front feed member associated with said carriage for moving sheets from said intermediate position to the press guides.

5. Mechanism for feeding sheets from a pile to the guides of a press, comprising a carriage reciprocable between forward and rear positions, a plurality of rear suction members associated with said carriage for separating sheets from the pile and moving them forward to an intermediate position, means for imparting a dipping movement to said rear suction member when said carriage is substantially in its rear position, and a plurality of front suction members, one for each press guide, associated with said carriage for moving sheets from said intermediate position to the press guides.

6. Mechanism for feeding sheets from a pile to the guides of a press, comprising a carriage reciprocable between forward and rear positions, a rear suction member associated with said carriage for separating sheets from the pile and moving them forward to an intermediate position, suction means for maintaining the sheets in such intermediate position, and a front feed member associated with said carriage for moving sheets from said intermediate position to the press guides.

7. Mechanism for feeding sheets from a pile to the guides of a press, comprising a feed-board, a carriage reciprocable between forward and rear positions, a rear suction member associated with said carriage for separating sheets from the pile and moving them forward to an intermediate position, and a front feed member associated with said carriage for moving sheets from said intermediate position to the press guides, said feed-board being formed with a suction opening therein for maintaining the sheets in said intermediate position until moved onward by said front feed member.

8. Mechanism for feeding sheets from a pile to the guides of a press, comprising a feed-board, a carriage reciprocable between forward and rear positions, a rear suction member associated with said carriage for separating sheets from the pile and moving them forward to an intermediate position, a front feed member associated with said carriage for moving sheets from said intermediate position to the press guides, said feed-board being formed with a suction opening therein for maintaining the sheets in said intermediate position until moved onward by said front feed member, and means for directing an air blast against the under sides of the sheets prior to their being moved forward by said front feed member.

9. Mechanism for feeding sheets from a pile to the guides of a press, comprising a feed-board, a carriage reciprocable between forward and rear positions, a rear suction member associated with said carriage for separating sheets from the pile and moving them forward to an intermediate position, and a front feed member associated with said carriage for moving sheets from said intermediate position to the press guides, said feed-board being formed with a suction opening therein for maintaining the sheets in said intermediate position until moved onward by said front feed member, and said feed-board being formed with a transverse channel having air pressure means associated therewith so as to direct a blast against the sheets prior to their being moved forward by said front feed member.

10. Mechanism for feeding sheets from a pile to the guides of a press, comprising tracks having movable extensions, a carriage reciprocable on said tracks between forward and rear positions, a rear suction member associated with said carriage and supported by said tracks and extensions for separating sheets from the pile and moving them forward to an intermediate position, means for moving said track-extensions to cause said rear suction member to dip towards the pile when the carriage is substantially in its rear position, and a front member associated with said carriage for moving sheets from said intermediate position to the press guides.

11. Mechanism for feeding sheets from a pile to the guides of a press, comprising tracks, movable track-extensions, a carriage reciprocable on said tracks, a frame movably connected with said carriage and supported by said tracks or track-extensions during the reciprocations of said carriage, a rear suction member associated with said frame, means for moving said track-extensions to cause said frame to dip, and front feed members associated with said carriage.

12. In a sheet-feeding device, a track, a movable track-extension, a reciprocable feed carriage, a suction member movably connected with said carriage and supported by said track or track-extension and means for moving said track-extension to effect a dipping of said member.

13. In a sheet-feeding device, a track, an extension pivoted to said track, a reciprocable feed carriage, a suction member movably connected with said carriage and supported by said track or extension, and means for moving said extension about its pivot.

14. In a sheet-feeding device, a track, an extension pivoted to said track, a reciprocable feed carriage, a frame pivoted to said carriage and resting on said track or extension, a suction member associated with said frame, and means for moving said extension about its pivot.

15. In a sheet-feeding device, a track, an extension pivoted to said track, a reciprocable feed carriage, a frame pivoted to said carriage and resting on said track or extension, a suction member associated with said frame, and a cam-actuated bell-crank lever for moving said extension about its pivot.

16. In a sheet feeding device, tracks, track-extensions pivoted to said tracks, a reciprocable feed carriage, arms pivoted to said carriage and resting on said tracks or track-extensions, a cross-bar connecting said arms, suction members carried by said cross-bar, and means for moving said extensions about their pivots.

17. In a sheet feeding device, tracks, track-extensions pivoted to said tracks, a reciprocable feed carriage, arms pivoted to said carriage and resting on said tracks or track-extensions, a cross-bar connecting said arms, suction members carried by said cross-bar, and cam-actuated bell crank levers for moving said extensions about their pivots.

18. In a device for feeding sheets across a feed-board to press guides, tracks, extensions to said tracks at the ends thereof remote from said guides, an arm pivoted adjacent the end of the feed board remote from said guides, means for rocking said arm, a feed carriage reciprocable upon said tracks, and a link detachably connected between said carriage and said arm, whereby said arm normally effects a reciprocation of said carriage and upon said link being disconnected said carriage can be stored upon said track extensions.

19. In a sheet feeding device, a pivoted arm, a slotted lever connected with said arm, a crank cooperating with said lever, a feed carriage, and a link connecting said carriage with said arm.

20. In a sheet feeding device, a crank, a lever having a slot for the pin of said crank, a pivoted arm, a link between said lever and said arm, a feed carriage, and a link between said arm and said carriage.

21. In a sheet feeding device for a printing press, a feed frame at the rear of the press, a slotted lever pivoted to the lower part of said frame, a crank carried by said frame and driven from the press actuating said lever, a shaft carried by said frame, a lever secured to said shaft and connected with said slotted lever, a pair of arms secured to said shaft, a reciprocable feed carriage, and links connecting said carriage with said arms.

22. In a sheet feeding device, a carriage, means for reciprocating said carriage, rear suction members associated with said carriage for feeding sheets forward to an intermediate position, and front suction members associated with said carriage for feeding sheets forward from such intermediate position.

23. In a sheet-feeding device, a carriage, means for reciprocating said carriage, rear suction members associated with said carriage for separating sheets from a pile and feeding them forward to an intermediate position, and front suction members associated with said carriage for feeding sheets forward from such intermediate position.

24. In a sheet feeding device, a carriage, means for reciprocating said carriage, rear members associated with said carriage for moving sheets forward to an intermediate position, front members associated with said carriage for moving sheets forward from said intermediate position, and suction means for maintaining the sheets in such intermediate position until moved forward by said front members.

25. A sheet feeding device comprising a feed board, a carriage, means for reciprocating said carriage on said board, rear members associated with said carriage for moving sheets forward to an intermediate position on said board, front members associated with said carriage for moving sheets forward from said intermediate position, said feed board being formed with suction openings for maintaining the sheets in said intermediate position until moved forward by said front members.

26. In a sheet feeding device, a reciprocable feed carriage, rear members associated with said carriage for moving sheets forward to an intermediate position, front suction members for moving the sheets forward from such intermediate position, and means for directing an air blast beneath the sheet prior to its being moved forward by said front suction members.

27. In a sheet feeding device, a reciprocable feed carriage, rear members associated with said carriage for moving sheets forward to an intermediate position, front suction members for moving the sheets forward from such intermediate position, suction means for maintaining the sheets in said intermediate position until moved forward by said front suction members, and means for directing an air blast beneath the sheet prior to its being moved forward by said front suction members.

28. In a sheet feeding device, a feed board, a carriage reciprocable upon said board, a rear member associated with said carriage for moving sheets forward to an intermediate position on the feed-board, a front suction member associated with said carriage for receiving said sheets at said intermediate position and moving them forward, means for raising said front suction member from the board, and means for causing said front suction member to descend to the board to receive a sheet.

29. In a sheet feeding device, a feed board, a carriage reciprocable upon said board, a rear member associated with said carriage for moving sheets forward to an intermediate position on the feed-board, a front suction member associated with said carriage for receiving said sheets at said intermediate position and moving them forward, means for raising said front suction member from the board, means for causing said front suction member to descend to the board to receive the sheet, and means for slightly raising said front suction member just after it receives a sheet.

30. In a sheet feeding device, a feed board, a carriage reciprocable upon said board, a rear member associated with said carriage for moving sheets forward to an intermediate position on the feed-board, a front suction member associated with said carriage for receiving said sheets at said intermediate position and moving them forward, means for raising said front suction member from the board, means for causing said front suction member to descend to the board to receive the sheet, means for slightly raising said front suction member just after it receives a sheet, and means for directing an air blast beneath the sheet prior to its being moved forward by said front suction member.

31. In a sheet feeding device, a reciprocable carriage, a shaft mounted to rock therein, a suction feed arm mounted on said shaft, a cam-arm on said shaft, a fixed cam adapted to be engaged by said cam-arm adjacent one end of the travel of said carriage whereby said feed arm is caused to descend, and another fixed cam adapted to be engaged by said cam arm adjacent the other end of the travel of said carriage whereby the feed arm is caused to raise.

WALTER H. SMITH.

Witness:
MARIE REICK.